(12) United States Patent
Park et al.

(10) Patent No.: US 12,430,341 B2
(45) Date of Patent: Sep. 30, 2025

(54) SCENARIO SIMILARITY RETRIEVAL-BASED AUTOMATIC SCENARIO GENERATION SYSTEM AND METHOD

(71) Applicant: Korea Electronics Technology Institute, Seongnam-si (KR)

(72) Inventors: Chang Gue Park, Seoul (KR); Kyoung Won Min, Seongnam-si (KR); Haeng Seon Son, Seongnam-si (KR); Seon Young Lee, Seoul (KR); Young Bo Shim, Seongnam-si (KR); Gi Ho Sung, Seongnam-si (KR); Jin Man Park, Gwangju-si (KR); Yeong Kwon Choe, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 8 days.

(21) Appl. No.: 18/089,674

(22) Filed: Dec. 28, 2022

(65) Prior Publication Data

US 2024/0184787 A1 Jun. 6, 2024

(30) Foreign Application Priority Data

Dec. 2, 2022 (KR) .......... 10-2022-0166795

(51) Int. Cl.
*G06F 16/2457* (2019.01)
*G07C 5/08* (2006.01)

(52) U.S. Cl.
CPC ....... *G06F 16/24575* (2019.01); *G07C 5/085* (2013.01)

(58) Field of Classification Search
CPC .......... G06F 16/24575; G07C 5/085
See application file for complete search history.

(56) References Cited

U.S. PATENT DOCUMENTS

| | | | |
|---|---|---|---|
| 2020/0050721 A1 | 2/2020 | Cahoon et al. | |
| 2020/0250067 A1 | 8/2020 | Walther et al. | |
| 2021/0158165 A1* | 5/2021 | Liu | G06N 3/045 |
| 2021/0406262 A1* | 12/2021 | Unnikrishnan | G06F 16/248 |
| 2023/0406345 A1* | 12/2023 | Wu | B60W 30/18163 |

OTHER PUBLICATIONS

Korean Office Action issued on Jul. 31, 2024, in counterpart Korean Patent Application No. 10-2022-0166795 (2 pages in English, 5 pages in Korean).

* cited by examiner

*Primary Examiner* — Charles Rones
*Assistant Examiner* — Xiaoqin Hu
(74) *Attorney, Agent, or Firm* — NSIP Law

(57) ABSTRACT

There are provided a scenario similarity retrieval-based automatic scenario generation system and method. According to an embodiment, a scenario retrieval-based automatic scenario generation method includes: retrieving scenarios similar to a query scenario from a scenario DB for an autonomous driving test; filtering only scenarios that meet a selection condition from the retrieved scenarios; and converting components of the filtered scenarios to suit a target condition. Accordingly, a desired scenario may be automatically generated by retrieving a scenario similar to a targeted scenario, converting the retrieved scenario, and concretizing the scenario.

9 Claims, 7 Drawing Sheets

| Terms | Description |
|---|---|
| Scene | A scene describes a snapshot of the environment including the scenery and dynamic elements, as well as all actors' and observers' self-representations, and the relationships among those entities. Only a scene representation in a simulated world can be all-encompassing (objective scene, ground truth). In the real world it is incomplete, incorrect, uncertain, and from one or several observers' points of view (subjective scene). |
| Scenario | A scenario describes the temporal development between several scenes in a sequence of scenes. Every scenario starts with an initial scene. Actions & events as well as goals & values may be specified to characterize this temporal development in a scenario. Other than a scene, a scenario spans a certain amount of time. |
| Operational design domain | Operating conditions under which a given driving automation system or feature thereof is specifically designed to function, including, but not limited to, environmental, geographical, and time-of-day restrictions, and/or the requisite presence or absence of certain traffic or roadway characteristics |
| Criticality | Combined risk of the involved actors when the situation is continued |
| Criticality phenomena | concrete influencing factors in a scenario that are associated with increased criticality |
| Abstract scenario | formalized, declarative description derived from a functional scenario |
| Logical scenario | scenario described with the inclusion of parameters, which values are defined as ranges |
| Concrete scenario | scenario depicted with explicit parameters values, describing physical attributes. Parameter values can consist of default values, randomly chosen values or advisedly chosen values |

FIG. 7

SCENARIO SIMILARITY RETRIEVAL-BASED AUTOMATIC SCENARIO GENERATION SYSTEM AND METHOD

CLAIM OF PRIORITY

This application is based on and claims priority under 35 U.S.C. § 119 to Korean Patent Application No. 10-2022-0166795, filed on Dec. 2, 2022, in the Korean Intellectual Property Office, the disclosure of which is herein incorporated by reference in its entirety.

BACKGROUND

Field

The disclosure relates to assessing and validating an autonomous vehicle, and more particularly, to a method for generating a traffic scenario for assessing and validating functions of an autonomous vehicle in various traffic situations.

Description of Related Art

In an approval process of an official organization to introduce vehicles having autonomous driving systems of Society of Automotive Engineers (SAE) Lv. 4 or higher mounted therein to the market, rational validation and assessment of systems are required. Researches on validation and assessment methods are proceeding with the aim of testing autonomous driving systems in various situations and statistically analyzing results of the test.

In the test of a system, a scenario-based testing method is used. The scenario-based testing method may generate driving scenarios of various situations and test the scenarios in order to check whether there is no abnormality in operating within an operational design domain (ODD), which is a range where the system is operable, and whether there are preparations for a risk in terms of safety, law, restrictions in a driving situation through criticality phenomena (CP).

The ODD is configured for a real environment, and accordingly, there is a need for a technology that makes a real driving situation as a scenario.

SUMMARY

The disclosure has been developed in order to solve the above-described problems, and an object of the disclosure is to provide a method for automatically generating various real driving situations as a scenario, and provide the following functions:

1) in a situation in which driving is tested on a real road, retrieving a scenario similar to the current situation from pre-stored scenarios, and generating and providing a modified scenario to merge the retrieved scenario into the current situation or a map;
2) in a situation in which continuous driving is tested in a large-scale simulation region, retrieving a scenario similar to the current situation from pre-stored scenario, and generating and providing a modified scenario to merge the retrieved scenario into the current situation and a map;
3) when there is a target scenario, retrieving a scenario similar thereto from pre-stored scenarios, and generating and providing a modified scenario to merge the retrieved scenario into the target scenario or a map, or providing the retrieved scenario without modifying;
4) retrieving and providing a scenario corresponding to an ODD condition by referring to an proposed ODD, CP; and
5) modifying a provided scenario according to a proposed target format and providing.

According to an embodiment of the disclosure to achieve the above-described object, a scenario retrieval-based automatic scenario generation method may include: retrieving scenarios similar to a query scenario from a scenario DB for an autonomous driving test; filtering only scenarios that meet a selection condition from the retrieved scenarios; and converting components of the filtered scenarios to suit a target condition.

Retrieving may include: calculating a similarity by comparing the query scenario and scenarios stored in the DB; sorting scenarios with reference to the calculated similarity; and selecting scenarios that have a similarity greater than or equal to a predetermined level.

Calculating the similarity may include: extracting feature values from the scenarios; and calculating a similarity between the extracted feature values.

Extracting may include: selecting scenes from the scenarios; and extracting feature values from the selected scenes.

Extracting may include: classifying the components of the scenarios into a plurality of groups; and extracting feature values from the classified groups.

The selection condition may include an ODD, CP, a filtering condition.

The filtering condition may include a scenario abstraction step, a scenario level, an effectiveness validation method, and a position where a scenario is collected.

According to an embodiment, the scenario retrieval-based automatic scenario generation method may further include: validating effectiveness of the converted scenario; and concretizing the validated scenario.

Concretizing may include converting an abstract scenario into a logical scenario through parameterization, and concretizing a logical scenario into a concrete scenario by sampling a specific value based on probability distribution.

According to another embodiment of the disclosure, a scenario retrieval-based automatic scenario generation system may include: a scenario DB configured to test autonomous driving; and a scenario generation system configured to retrieve scenarios similar to a query scenario from the scenario DB, to filter only scenarios that meet a selection condition from the retrieved scenarios, and to convert components of the filtered scenarios to suit a target condition.

According to another embodiment of the disclosure, a scenario retrieval-based automatic scenario generation method may include: retrieving scenarios similar to a query scenario from a scenario DB for an autonomous driving test; converting components of the retrieved scenarios to suit a target condition; and concretizing the converted scenarios.

According to another embodiment of the disclosure, a scenario retrieval-based automatic scenario generation system may include: a scenario DB configured to test autonomous driving; and a scenario generation system configured to retrieve scenarios similar to a query scenario from the scenario DB, to convert components of the retrieved scenarios to suit a target condition, and to concretize the converted scenarios.

According to embodiments of the disclosure as described above, a desired scenario may be automatically generated by retrieving a scenario similar to a targeted scenario, converting the retrieved scenario, and concretizing the scenario, and the following effects may be provided:

1) an effect of selecting a scenario with reference to a proposed ODD, CP;
2) an effect of modifying scenario components and formats to suit a proposed target format, and providing;
3) an effect of generating various driving scenarios by utilizing pre-stored scenarios;
4) an effect of converting a driving situation of a real autonomous vehicle into a scenario and retrieving a similar scenario to the corresponding driving situation;
5) an effect of converting a driving situation of a real autonomous vehicle into a scenario and retrieving a scenario applicable to the corresponding driving situation; and
6) an effect of introducing a specific scenario regarding a certain traffic situation to the corresponding traffic situation.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 is a table showing definition of terms.

DETAILED DESCRIPTION

Figure 1:
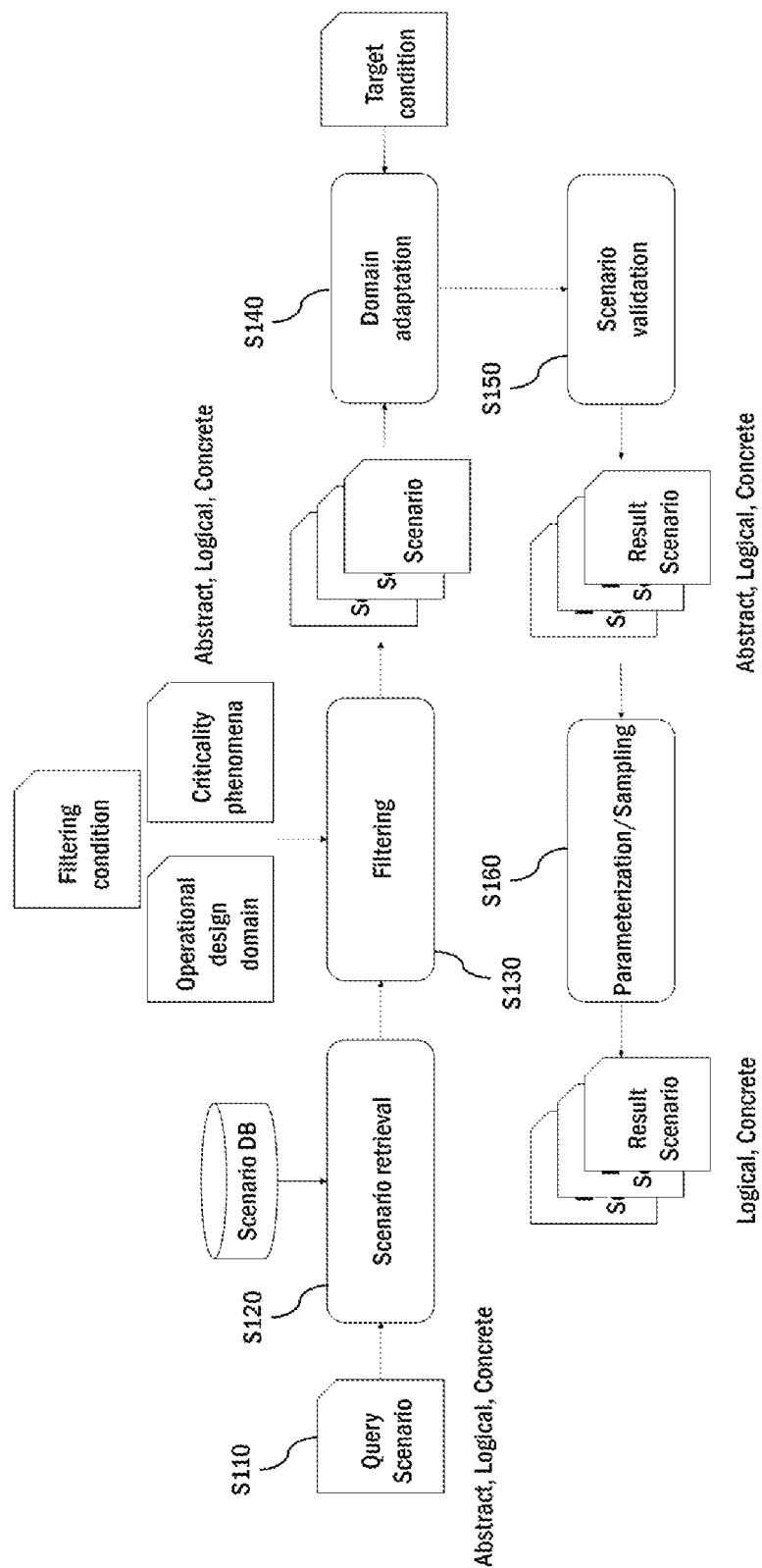
FIG. 1 is a view illustrating a scenario retrieval-based automatic scenario generation method according to an embodiment of the disclosure.

Hereinafter, the disclosure will be described in more detail with reference to the accompanying drawings.

An embodiment of the disclosure proposes a method and a system for automatic scenario generation based on scenario similarity retrieval. Specifically, the embodiment proposes a technology for automatically generating a new traffic scenario by retrieving, from a database, a traffic scenario similar to an inputted traffic scenario in terms of a driving environment, an ODD, a risk, and modifying and merging the similar traffic scenario to be used in a test.

1. Scenario-Based Test 1.1 Method of Utilizing ODD

Complexity and uncertainty of an environment that an autonomous vehicle encounters when it travels are almost limitless. In related-art validation methods, it is checked how many hours the vehicle travels and how far the vehicle travels on a real road in order to deal with the limitless situations. However, it may be difficult to check whether all risk factors that can happen to the vehicle during driving are dealt with.

Accordingly, in a scenario-based validation method, an environment that operates when a concept of a vehicle is designed is limited to the ODD, and scenarios possible within the limited ODD are tested and safety is validated from various aspects.

As described above, the ODD limits an operational range of a system with respect to all factors related to driving, such as an operation on a road and a road itself.

In an embodiment of the disclosure, an ODD is compared with pre-stored scenarios and scenarios included in a proposed ODD are selected.

1.2 Method of Utilizing CP

A system may suffer from various risks during an operation within an ODD. For example, an autonomous vehicle may have the risk of colliding with another vehicle nearby or a pedestrian, or violating the traffic law. In order to validate the system, it is necessary to check whether the system operates against all risk situations that it encounters during an operation within the ODD, and has preparations for the risks.

Factors that cause a risk situation may be referred to as risk factors (CP), and the CP is pre-defined through criticality analysis which is based on a real case and a simulation.

The risk situation may be defined by CP and it may be identified whether a specific scenario includes a certain risk situation through the CP.

In an embodiment of the disclosure, CP is compared with pre-stored scenarios, and it is checked whether a scenario includes CP proposed to implement a risk situation, and a scenario including the corresponding CP is selected.

1.3 Method of Utilizing Ontology

An ontology refers to a knowledge representation format and data structure which are used for utilizing abstract information in a computation processing device in knowledge engineering.

Various groups related to autonomous driving systems, such as a company which develops autonomous vehicles, an organization which analyzes a traffic situation, and a research institute which studies new technology related to autonomous driving, manage knowledge regarding traffic situations and autonomous driving systems in various ways according to their own ontologies.

Various groups participating in development and validation of ODD, CP, scenario, traffic situation, autonomous driving system and platform deal with data based on their respective ontologies, and it is necessary to unify ontologies or to define relationship between ontologies for mutual cooperation therebetween.

In an embodiment of the disclosure, an adapter for reading out data based on an ontology of each group is generated in order to utilize information generated in various groups for a system.

2. Scenario 2.1 Types of Scenarios

In a scenario-based system validation method, it is necessary to systematically deal with scenarios which are applied to respective steps in the process of designing a concept of a system, developing, and testing, and to ensure traceability regarding a rationale for generating a scenario suitable to each step. In particular, as steps in the progress of an autonomous driving system proceeds, system components become concretized from an abstract concept. Accordingly, scenarios have different types according to the abstraction step of the system components.

There are four types of scenarios according to the abstraction step: a functional scenario which corresponds to a concept designing step and organizes traffic situations that may occur within the ODD of a system, based on natural language and knowledge; an abstract scenario which transforms the functional scenario to be stored in and processed by a computation device; a logical scenario which organizes states of components of the abstract scenario according to a parameter, a range of the parameter, and probability distribution; and a concrete scenario which selects a specific value from the range of the logical scenario based on probability distribution.

2.2 Components and Structure of Scenario

In a scenario-based test, various traffic situations necessary for the test are simulated through scenarios. Accordingly, scenario components for reflecting various traffic situations on scenarios and a method for structurally organizing the scenario components are being researched. The components may be specifically divided to organize various factors related to traffic situations, such as a position of a road, shape, arrangements of traffic objects, and a state of each component is defined based on a parameter. In addition, the components may be classified and organized into groups having similar characteristics, so that the components are efficiently processed, stored and managed when they are simulated or various scenarios are managed.

A 6 Layer model organized in the PEGASUS project is a representative method. In this model, components of a traffic situation are classified into 6 layers according to characteristics. Layer 1 includes elements related to a traffic system such as a road system and a signal system. Layer 2 includes structures arranged around a road such as buildings and vegetation. Layer 3 includes elements defining a temporary change in a target of Layer 1 and Layer 2. Layer 4 includes a traffic object which has its state changed such as a vehicle, a pedestrian, and an animal. Layer 5 includes an environmental element such as weather and illuminance, and Layer 6 includes a communication element used for autonomous driving.

Additionally, there is a method that adds a state element of a test target vehicle to the 6 layer model as Layer 0.

When a value is changed or information is processed through the above-described scenario component classification method, a separate algorithm suitable to characteristics of each of pre-classified groups may be used.

2.2. Generation of Scenario

A scenario refers to data that organizes traffic situations with a normalized format and structure. Scenario generation methods which are currently being researched will be described.

There is a method of generating a scenario from traffic situations collected in a system which has a sensor and a recognition logic mounted therein to recognize a traffic situation. This method collects traffic situations by using systems like a traffic situation collector installed in an autonomous vehicle or an infrastructure, a portable traffic situation collector, etc.

There is a method of generating a scenario through a collected traffic situation case document. This method recognizes a document that organizes cases in which physical and social damages are caused, such as accident cases in which property damage and bodily injury are caused, traffic law and regulation violation cases, driving cases in which a traffic jam is caused, which are previously collected, and generates a scenario based on the document.

There is a method of generating a scenario based on experts' knowledge. An expert generates a scenario by using a generation tool based on experiment on various traffic situations.

There is a method of generating a temporary scenario based on constraints on an environment or a special condition such as an ODD and CP. This method generates a scenario by randomly allocating other scenario components that include CP conditions selected in a road environment or range restricted in an ODD, and that are not previously defined.

There is a method of generating a scenario based on a pre-stored scenario. This method generates a new scenario by modifying and augmenting components of the pre-stored scenario.

Lastly, there is a method of generating a scenario by implementing a certain traffic situation through a simulation. This method generates a scenario by collecting a traffic situation meeting a specific condition with respect to random situation, in which elements constituting a traffic situation are randomly allocated in a simulation and are implemented.

3. Scenario Retrieval-Based Automatic Scenario Generation Method 3.1 Summary

Validation/assessment of an autonomous driving system requires a test in a scenario regarding various traffic situations. In particular, with respect to a scenario in which a risk is revealed during the test, it is necessary to reproduce various situations where the same risk may be revealed. Accordingly, with respect to scenarios containing a risk during the test, it is necessary to generate scenarios similar thereto and to test the scenarios. A method of generating similar scenarios may include a method of directly modifying a corresponding scenario or a method of generating a completely new scenario by using components of the corresponding scenario as materials. However, it is necessary to limit the range of generating scenarios to real cases or pre-stored data since resulting scenarios are almost limitless.

In addition, it is necessary to select a scenario meeting an ODD condition which restricts an environment and a situation where an autonomous driving system can operate, and a CP condition in which a risk is revealed.

Scenarios generated according to an embodiment of the disclosure are used to validate/assess an autonomous driving system in a vehicle proving environment (proving ground) or a simulation environment where a scenario is reproduced.

3.2 Method

The scenario retrieval-based automatic scenario generation method according to an embodiment of the disclosure is illustrated in FIG. 1, and is mostly divided into five steps: an adapter generation step (S110); a scenario retrieval step (S120), a filter step (S130), a domain adaptation step (S140); a scenario validation step (S150); and a parametrization/sampling step (S160).

3.3 Input/Output Data

Used data includes an ontology, a format, a scenario, an operational design domain (ODD), criticality phenomena (CP), a filtering condition, a target condition.

The ontology is definition of terms and concepts of data used as an input, and an ontology regarding pre-stored data and an ontology regarding newly inputted data may be matched with each other and used. Through this, data may be used without respect to terms and concepts that are differently defined.

The format refers to a way of indicating relationship between terms and concepts in data, listing, and storing data.

The scenarios are differently organized according to an ontology and a format. The scenarios may be divided into an abstract type, a logical type, and a concrete type. The functional scenario may be excluded since it is not dealt with by a computation processing device.

The ODD and the CP are not fixed like the scenario and are organized differently according to an ontology and a format.

The filtering condition includes various elements other than the ODD and the CP that may be used when scenario components and scenarios are selected, such as a generating time, a type of an object to be treated, the number of objects.

The target condition includes a condition regarding an output value, such as an ontology, a format to be used in a result scenario, and a storage format. The target condition additionally includes a specific component, and the corresponding component may be used as a condition for changing a scenario.

3.4 Adapter Generation

This is a step of generating an adapter which maps ontologies and a query ontology and reads out scenario, map, CP and ODD data in various formats.

Figure 2:
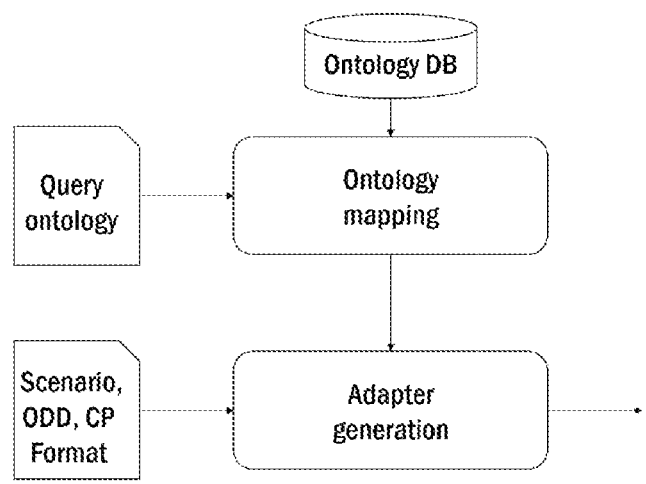
FIG. 2 is a view illustrating an adapter generation process.

The scenario, map, CP, and ODD may be described based on machine-readable language (ontology) such as OWL, RDF, etc. A process of generating an adapter for reading out respective data includes an ontology mapping step and an adapter generation step as shown in FIG. 2.

Ontology mapping: This is a step of connecting ontologies pre-stored in an ontology database (DB) and a query ontology which is a basis of input data. Through this step, terms and concepts used in the input data match terms and concepts pre-stored in the DB.

Adapter generation: This is a step of receiving, as an input, a format in which an extension of input data and a material structure are organized, and generating an adapter based on pre-organized terms and concepts. Data created based on the query ontology and the format may be read out through the generated adapter.

3.5 Scenario Retrieval

At this step, a similar scenario is retrieved by a method of calculating a similarity by comparing a scenario inputted as a query scenario and scenarios pre-stored in the scenario DB, sorting scenarios with reference to the similarity, and selecting scenarios having a similarity greater than or equal to a predetermined level. A similarity of a scenario may be calculated in various ways.

Calculation of a similarity may include a representation function and a similarity function. The representation function is a part that converts data received as an input into a feature value, and extracts a feature value from input data in the form of a natural language, a graph, an image or a vector through a classical algorithm or a deep learning algorithm, and converts the feature value into a feature value in the form of a vector, a semantic feature, a graph.

The similarity function is a part that receives the feature value converted by the representation function as an input, and calculates a similarity between the two feature values. The method of calculating a similarity may include a method of calculating a similarity itself by using a distance function, a method of estimating a probability of similarity, or a method of classifying groups through clustering.

There are two examples of an input to the representation function.

Figure 3:
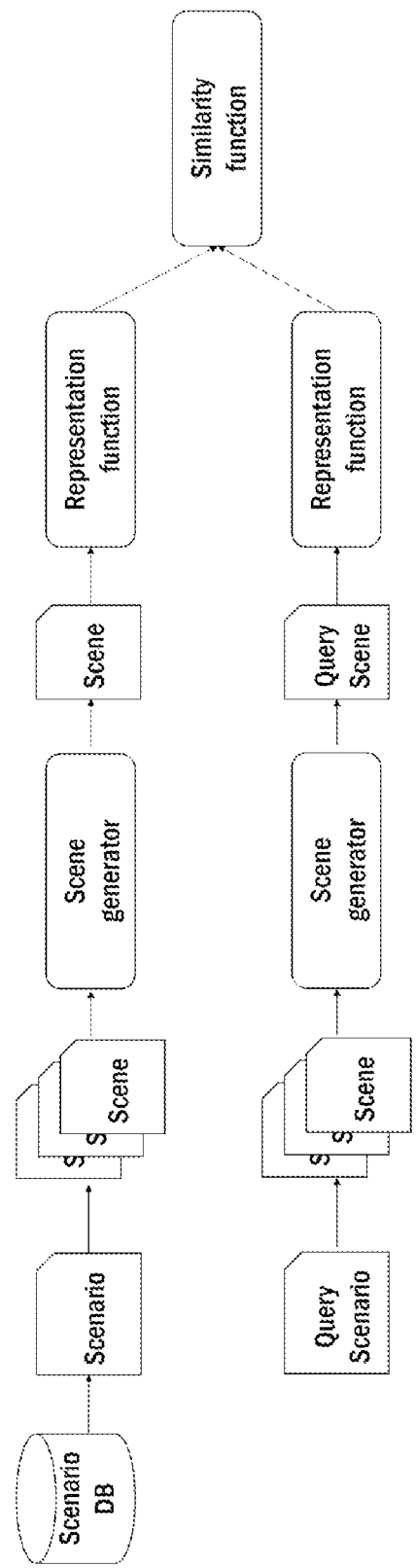
FIG. 3 is a view illustrating calculating a scenario similarity through scenes.

First, there is a method of calculating a similarity with reference to scenes. As shown in FIG. 3, scenes are generated as a specific condition in each scenario, and a component of each scene is converted into a feature value through the representation function. A similarity between converted feature values for each scene is calculated by comparison through the similarity function.

In this process, the similarity is compared with respect to a scene that is automatically selected by a selection logic from scenes of various time points constituting a scenario extracted from the database. On the other hand, for a scenario used as a query, a similarity is compared by using a scene that is directly selected by a user or automatically selected by a selection logic. The selection logic automatically extracts a scene based on a time, a position, etc. of the scene.

Figure 4:
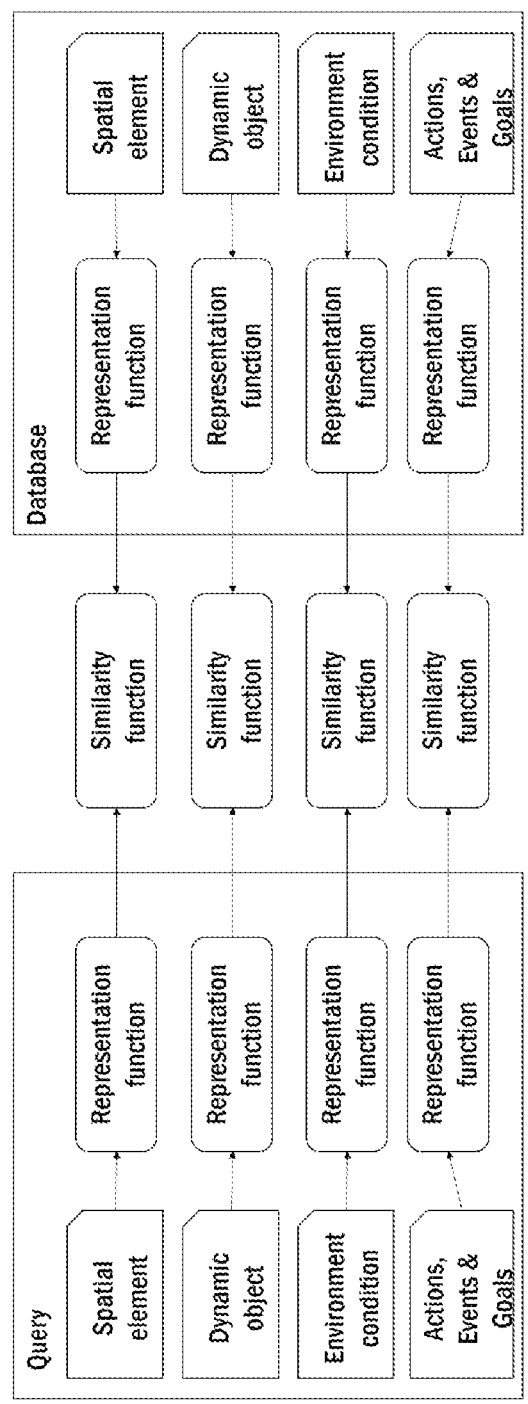
FIG. 4 is a view illustrating calculating a scenario similarity through comparison between groups having similar characteristics.

There is a method of calculating a similarity by comparing groups having similar characteristics among scenario components. As shown in FIG. 4, groups having similar characteristics among scenario components existing in the query and the scenario DB are separated from other components, and are converted into feature values through the representation function. A similarity with feature values converted from the same target is calculated by comparison through the similarity function. All components are not always used and the components are selectively used according to a defined condition.

Attribute groups classified by a few characteristics may be combined on a group basis, by stages, serially or in parallel, and a similarity may be calculated. In one scene, arrangements of dynamic objects may be compared and arrangements of spatial elements (map, a static object, a structure) may be compared.

3.6 Filtering

At this step, scenarios are selected by comparing components of the retrieved scenarios and a selection condition (ODD, CP, filtering condition). The filtering condition may include a scenario abstraction step (abstract, logical, concrete), scenario layers (L0-L6), a verification and validation method, and a position where a scenario is collected, etc.

3.7 Domain Adaption

At this step, the selected scenarios are modified to suit components of a target, and modified data is organized according to a targeted ontology and format. Specifically, this is a process of modifying or merging selected scenarios to be similar to scenario components proposed in the target condition, and a target of this process may be a map or a component.

A targeted component partially includes a scenario component. When a specific road shape is provided as a targeted component as a first example of modification, the selected scenarios may be modified according to the corresponding road, by replacing a road with the provided road, adjusting or deleting positions of components belonging to the road, or changing a state value. When a specific range, probability distribution, or a probability distribution feature value is provided as a second example, existing components may be modified to the provided components.

3.8 Scenario Validation

At this step, effectiveness of values included in the finally modified scenarios are checked, or it is checked whether the scenarios are created according to the ontology and the format proposed as the target condition.

3.9 Parametrization/Sampling

At this step, the scenarios of respective corresponding types are concretized through parameterization and sampling. Through parameterization, a scenario of an abstract type that is not assigned parameters is concretized into a scenario of a logical type that is assigned parameters, range, probability distribution. Through sampling, a value within a range in a scenario of a logical type is extracted based on probability distribution, and is concretized into a concrete type.

3.10 Flow

Figure 5:
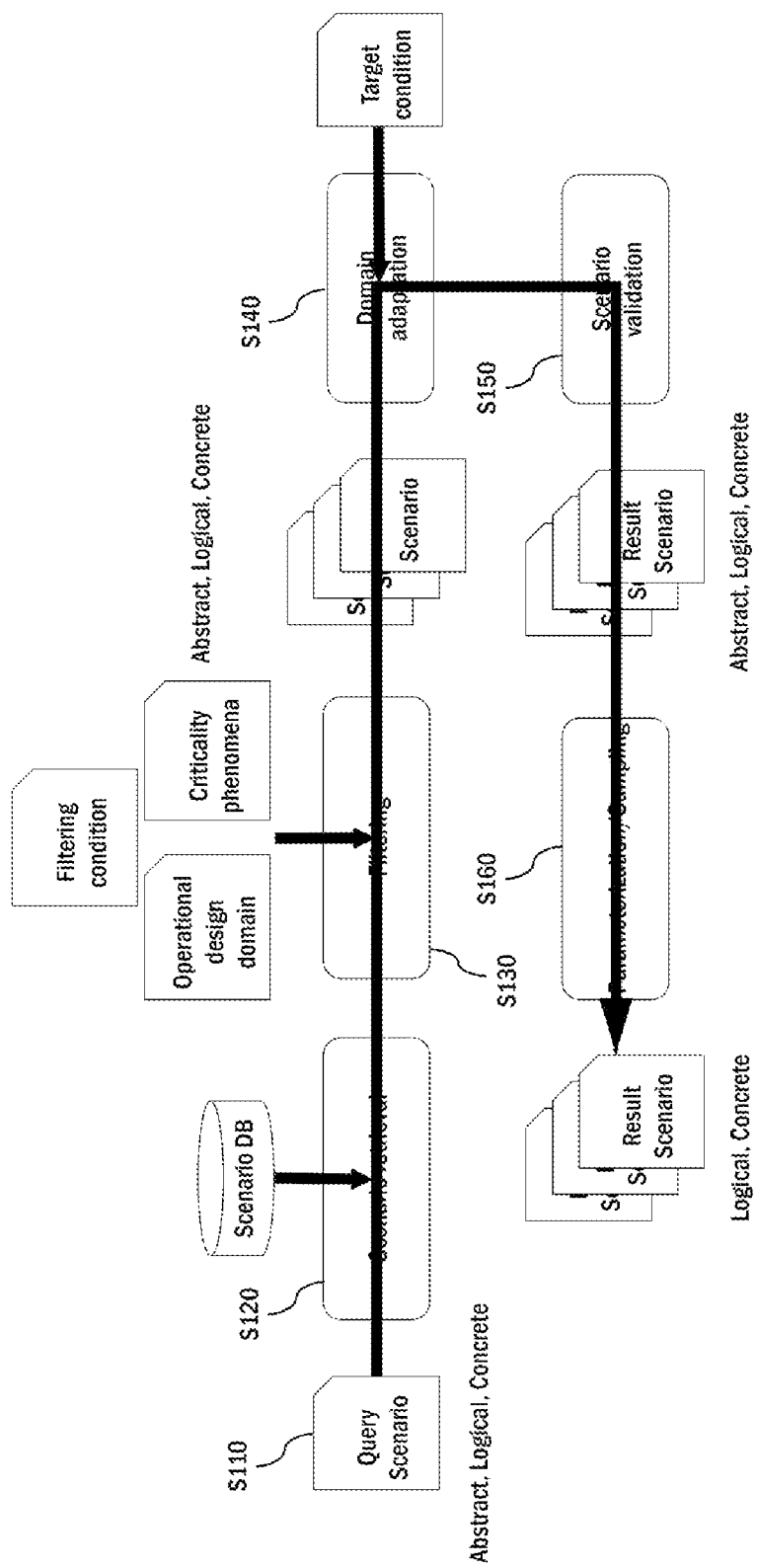
FIG. 5 is a flowchart of a scenario retrieval-based automatic scenario generation method.

A flow of the scenario retrieval-based automatic scenario generation method is illustrated in FIG. 5. As input data, a query scenario (abstract, logical concrete type), ODD, CP, a filtering condition, a target condition are used.

First, at the scenario retrieval step, scenarios similar to the query scenario are retrieved from the scenario DB (S120).

At the filtering step, scenarios are selected from the retrieved scenarios according to an ODD, CP, a filtering condition (S130). Through this, scenarios (abstract, logical, concrete type) that are similar to the query scenario and meet a selection condition are filtered.

At the domain adaption step, the filtered scenarios are converted to meet conditions proposed as the target condition (S140). Next, at the scenario validation step, effectiveness of the scenarios is validated (S150).

Among the validated scenarios (abstract, logical, concrete), an abstract type is parameterized into a logical type through parameterization, and a logical type is concretized into a concrete type through sampling (S160).

The generated scenarios are used to simulate in a process of assessing and validating an autonomous driving system or reproduce a traffic situation on a proving ground instance.

4. Scenario Retrieval-Based Automatic Scenario Generation System

Figure 6:
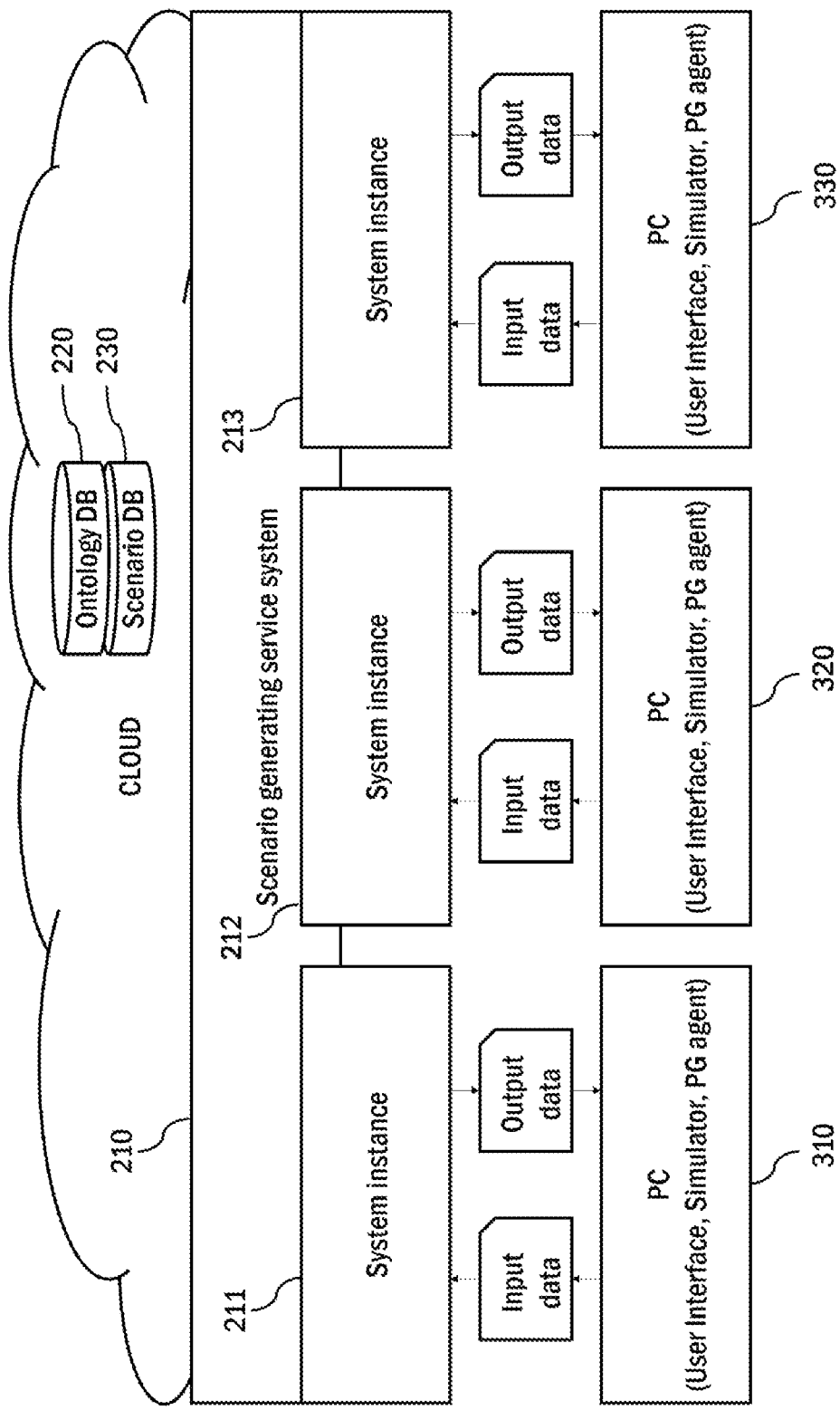
FIG. 6 is a view illustrating a scenario retrieval-based automatic scenario generation system.

An execution environment of the system is illustrated in FIG. 6. The system operates on a cloud and is managed in a scenario generation service system 210, and includes an ontology DB 220 and a scenario DB 230.

The service system 210 may copy the system into a plurality of system instances 211, 212, 213 on the could, and may manage the same, and includes a function of communicating with user PCs 310, 320, 330 through a network environment, and manages connection with each system instance 211, 212, 213.

The copied system instances 211, 212, 213 use the same ontology DB 220 and scenario DB 230.

5. Variations

Up to now, the scenario similarity retrieval-based automatic scenario generation system and method have been described with reference to preferred embodiments.

The terms used in embodiments of the disclosure are specifically defined in FIG. 7.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A processor-implemented method of validating an autonomous driving using scenario retrieval-based automatic scenario, the method comprising:

retrieving scenarios similar to a query scenario from a scenario database (DB) for an autonomous driving test;

filtering only scenarios that meet a selection condition from the retrieved scenarios;

converting components of traffic situations included in the filtered scenarios, by sampling parameters associated with the filtered scenarios, to generate the scenario retrieval-based automatic scenario associated with the query scenario, including merging the filtered scenarios into a map; and validating the autonomous driving by performing an autonomous driving test using the generated scenario retrieval-based automatic scenario, wherein the converting comprises converting an abstract scenario into a logical scenario, and concretizing a logical scenario into a concrete scenario by sampling a specific value of the parameters based on probability distribution, wherein the retrieving comprises:

calculating a similarity by comparing components of the query scenario with components of scenarios stored in the DB;

sorting scenarios with reference to the calculated similarity; and selecting scenarios that have a similarity greater than or equal to a predetermined threshold, and wherein the calculating the similarity comprises:

extracting feature values from the scenarios; and calculating a similarity between the extracted feature values, wherein the selection condition comprises an operational design domain (ODD), criticality phenomena (CP), and a filtering condition, wherein the ODD limits an operational range of a system with respect to factors, related to driving, including an operation on a road and the road, and wherein the filtering condition comprises a scenario abstraction step, an effectiveness validation method, and a position where a scenario is collected.

2. The method of claim 1, wherein the extracting comprises:

selecting scenes from the scenarios; and extracting feature values from the selected scenes.

3. The method of claim 1, wherein the extracting comprises:
classifying the components of the scenarios into a plurality of groups; and
extracting feature values from the classified groups.

4. The method of claim 1, further comprising:
validating effectiveness of the converted components of the filtered scenarios; and
concretizing the filtered scenarios using a result of the validating.

5. A system for validating an autonomous driving using scenario retrieval-based automatic scenario, the system comprising:
one or more processors configured to:
retrieve scenarios similar to a query scenario from a scenario database (DB);
filter only scenarios that meet a selection condition from the retrieved scenarios;
convert components of traffic situations included in the filtered scenarios, by sampling parameters associated with the filtered scenarios, to generate the scenario retrieval-based automatic scenario associated with the query scenario, including merging the filtered scenarios into a map; and
validate the autonomous driving by performing an autonomous driving test using the generated scenario retrieval-based automatic scenario,
wherein, for the converting, the one or more processors are configured to convert an abstract scenario into a logical scenario, and concretize a logical scenario into a concrete scenario by sampling a specific value of the parameters based on probability distribution,
wherein, for the retrieving, the one or more processors are configured to:
calculate a similarity by comparing components of the query scenario and components of scenarios stored in the DB;
sort scenarios with reference to the calculated similarity; and
select scenarios that have a similarity greater than or equal to a predetermined threshold, and
wherein, for the calculating the similarity, the one or more processors are configured to:
extract feature values from the scenarios; and
calculate a similarity between the extracted feature values,
wherein the selection condition comprises an operational design domain (ODD), criticality phenomena (CP), and a filtering condition,
wherein the ODD limits an operational range of the system with respect to factors, related to driving, including an operation on a road and the road, and
wherein the filtering condition comprises a scenario abstraction step, an effectiveness validation method, and a position where a scenario is collected.

6. The system of claim 5, wherein the one or more processors are further configured to:
validate effectiveness of the converted components of the filtered scenarios; and
concretize the filtered scenarios using a result of the validating.

7. A processor-implemented method of validating an autonomous driving using scenario retrieval-based automatic scenario, the method comprising:
retrieving scenarios similar to a query scenario from a scenario database (DB) for an autonomous driving test;
filtering only scenarios that meet a selection condition from the retrieved scenarios;
converting components of traffic situations included in the retrieved scenarios, by sampling parameters associated with the filtered scenarios, to generate the scenario retrieval-based automatic scenario associated with the query scenario, including merging the filtered scenarios into a map; and
concretizing the converted components of the retrieved scenarios;
validating the autonomous driving by performing an autonomous driving test using the generated scenario retrieval-based automatic scenario,
wherein the converting comprises converting an abstract scenario into a logical scenario, and concretizing a logical scenario into a concrete scenario by sampling a specific value of the parameters based on probability distribution,
wherein the retrieving comprises:
calculating a similarity by comparing components of the query scenario and components of scenarios stored in the DB;
sorting scenarios with reference to the calculated similarity; and
selecting scenarios that have a similarity greater than or equal to a predetermined threshold, and wherein the calculating the similarity comprises:
extracting feature values from the scenarios; and
calculating a similarity between the extracted feature values,
wherein the selection condition comprises an operational design domain (ODD), criticality phenomena (CP), and a filtering condition,
wherein the ODD limits an operational range of a system with respect to factors, related to driving, including an operation on a road and the road, and
wherein the filtering condition comprises a scenario abstraction step, an effectiveness validation method, and a position where a scenario is collected.

8. The method of claim 7, wherein the extracting further includes:
selecting scenes from the scenarios; and
extracting feature values from the selected scenes.

9. The method of claim 7, wherein the extracting further includes:
classifying the components of the scenarios into a plurality of groups; and
extracting feature values from the classified groups.

* * * * *